United States Patent
Komine

(10) Patent No.: US 9,329,819 B2
(45) Date of Patent: May 3, 2016

(54) CONSTRAINT EVALUATION AND RE-EVALUATION FOR MANAGING PRINT JOBS

(75) Inventor: Naoki Komine, Hawthorne, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 2078 days.

(21) Appl. No.: 12/410,189

(22) Filed: Mar. 24, 2009

(65) Prior Publication Data
US 2010/0245884 A1 Sep. 30, 2010

(51) Int. Cl.
G06F 3/12 (2006.01)

(52) U.S. Cl.
CPC ............ *G06F 3/1255* (2013.01); *G06F 3/1204* (2013.01); *G06F 3/1205* (2013.01); *G06F 3/1288* (2013.01)

(58) Field of Classification Search
USPC ......................................................... 358/1.15
See application file for complete search history.

(56) References Cited

U.S. PATENT DOCUMENTS

| | | | | |
|---|---|---|---|---|
| 5,129,639 | A * | 7/1992 | DeHority | 270/1.01 |
| 7,929,157 | B2 * | 4/2011 | Nakagiri | 358/1.13 |
| 2004/0111418 | A1 * | 6/2004 | Nguyen et al. | 707/100 |
| 2006/0012807 | A1 * | 1/2006 | Bos et al. | 358/1.8 |
| 2009/0021757 | A1 * | 1/2009 | Liu et al. | 358/1.13 |

OTHER PUBLICATIONS

Screenshots from MicroPress 7.5 software released by EFI in Apr. 2007.
Press Release by EFI regarding software release including the MicroPress 7.5, dated Apr. 18, 2007.

* cited by examiner

*Primary Examiner* — Ngon Nguyen
(74) *Attorney, Agent, or Firm* — Chen Yoshimura LLP

(57) ABSTRACT

An improved method implemented in a print job management apparatus for processing print jobs in a multiple-printer print shop environment is described. When an operator manually assigns a print job to a printer, the job ticket settings of print job are compared with capabilities of the printer to detect any constraints (i.e. incompatibilities). Messages including textual descriptions of the detected constraints are displayed in a UI, and job ticket settings that caused each constraint are displayed adjacent the corresponding message. The job ticket settings display allows the operator to change values of the job ticket settings and then re-evaluate the job assignment to detect any further constraints. The display and input steps are performed using a single UI. The changed job ticket settings are kept in a temporary version of the job ticket, and the original job ticket is updated with the changed values when the job is finally printed.

21 Claims, 5 Drawing Sheets

CONSTRAINT EVALUATION AND RE-EVALUATION FOR MANAGING PRINT JOBS

This application cross-references and incorporates by reference in its entirety U.S. patent application Ser. No. 12/037,529, filed Feb. 26, 2008, entitled "Multi-Tiered Constraint Checking for Managing Print Jobs".

BACKGROUND OF THE INVENTION

1. Field of the Invention

This invention relates to print job processing method and apparatus, and more particularly, to print job processing method and apparatus for a print shop employing multiple printers and finishing devices.

2. Description of Related Art

In an environment that processes a large number of print jobs with multiple printers, there has been a need to manage print jobs efficiently in an organized fashion. Examples of such an environment are professional print shops and print/copy departments at large organizations, where a variety of print requests, such as large-volume duplication and large document printing, needs to be processed and completed by utilizing multiple printers within a short turn-around time. These environments are collectively referred to as "print shops" in this application. Typically, each printing job specifies a source file that electrically contains a document to be printed, and specifies various the job requirements such as the size, color and the type of the paper on which the document should be printed, the printing resolution, duplex or simplex printing, finishing conditions such as book, staple, collate printing, etc., depending on a print job requester's needs. These job requirements are specified in a job ticket for each print job. In order to process a large volume of print jobs that differ in terms of these job parameters, a print shop utilizes multiple commercial grade printers. Typically, one or more black & white (B&W) printers are in operation to process B&W printing. Color printers are also installed to handle color printing. Each of these printers, however, has limitations on available printer settings, such as the paper size, the paper type, resolution settings, etc. In addition, the print shop employs various finishing devices, such as collators, staplers, hole punchers, folding machines, binding machines, etc. When a large volume of printing jobs is to be handled with multiple printers and finishing devices, it is a daunting task to assign each printing job to an appropriate printer with appropriate finishing devices.

An example of a print shop is schematically illustrated in more detail FIG. 1. In the print shop system, client computers 1 and 2 are connected to a server 4 via a local area network (LAN). Scanner 3 is also optionally connected to server 4 via the LAN. In this example, B&W printers 5 and color printers 6 (only one each is drawn in FIG. 1 to avoid overcrowding) are connected to the server through the LAN. In this example, printers 5-6 are commercial standard high-end printers that can handle high speed, high quality printing. Each of the printers 5-6 has multiple paper trays to store paper of various sizes, color, and types. Further, some of the printers 5-6 are equipped with an output sorting mechanism with multiple output trays to perform collate printing or other print finishing functions. A printer 8a is explicitly shown as having an associated finishing device 8b. Another printer 7 is shown as being connected over a network. Each printer has one or more display monitors to display the status of the printing and various warning and instruction messages to a user. Each printer is equipped with its own central processing unit (CPU) and appropriate hardware/software to control its own printing operations, and communicates with server 4 via a LAN. Some of these printers may also be multifunction printers that can perform copying and scanning of documents. Appropriate server software is installed in server 4 to perform various standard network administrative functions. FIG. 1 also illustrates an offline finishing device 9. An offline finishing device is a stand-alone device typically manually operated by an operator.

Print job management software is typically installed on server 4 for managing a large number of print jobs that come into the print shop. The print job management software may be stored in either a read only memory (ROM) or a hard disk drive (HDD), which can be accessed by the CPU of the server 4. Once a print shop operator calls the print job management software, server 4 reads out the print job management software from the ROM or HDD to a random access memory (RAM) of the server to carry out various functions of the software, including management of print jobs. The print job management software preferably is designed to run on Windows OS, Macintosh OS, or Unix X Windows or other computer operating systems implementing a user interface (UI), such as a touch screen and/or a mouse and a keyboard, coupled with a display monitor. Server 4 (or any suitable data processing apparatus) running print job management software is hereinafter referred to as "print job management server", or more broadly as "print job management apparatus" in this disclosure. Print jobs received by the print shop are forwarded to the server 4, so that numerous print jobs are analyzed and processed by the server.

SUMMARY

The present invention is directed to a print job processing method and apparatus that substantially obviates one or more of the problems due to limitations and disadvantages of the related art.

An object of the present invention is to provide an improved print job processing method and apparatus.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method implemented in a print shop management apparatus for managing a plurality of print jobs, each print job including a job ticket having a plurality of settings, the print shop management apparatus being connected to a plurality of printers each having its capabilities, the method including: (a) receiving an assignment of a print job to a printer by an operator, the print job including a job ticket having a plurality of original job ticket settings; (b) evaluating the assignment to detect any constraints by comparing the job ticket settings with capabilities of the printer; (c) displaying one or more messages each regarding a detected constraint; (d) displaying one or more job ticket settings that caused a detected constraint, the job ticket settings being displayed adjacent the corresponding message; (e) receiving a first operator input for changing a job ticket setting value of a job ticket setting displayed in step (d); and (f) in response to a second operator input, re-evaluating the assignment to detect any constraints by comparing the job ticket settings including the changed value received in step (e) with the capabilities of the printer.

In another aspect, the present invention provides a computer implemented method executed in a print shop management apparatus for managing a plurality of print jobs, each print job including a job ticket having a plurality of settings, the print shop management apparatus being connected to a plurality of printers each having its capabilities and executing print shop management software to carry out the method, the method including: (a) receiving a printer independent print job, the printer independent print job including a job ticket having a plurality of original job ticket settings; (b) detecting any constraints by comparing the job ticket settings with capabilities of a printer; (c) displaying one or more messages each regarding a detected constraint and one or more job ticket settings that caused a detected constraint in association with the corresponding message; (d) receiving a first operator input for changing a job ticket setting value of a job ticket setting displayed in step (c); and (e) detecting any constraints by comparing the job ticket settings including the changed value received in step (d) with the capabilities of the printer.

In another aspect, the present invention provides a computer program product comprising a computer usable medium having a computer readable program code embedded therein that causes a data processing apparatus to perform the above methods.

It is to be understood that both the foregoing general description and the following detailed description are exemplary and explanatory and are intended to provide further explanation of the invention as claimed.

DETAILED DESCRIPTION OF PREFERRED EMBODIMENTS

Figure 1:
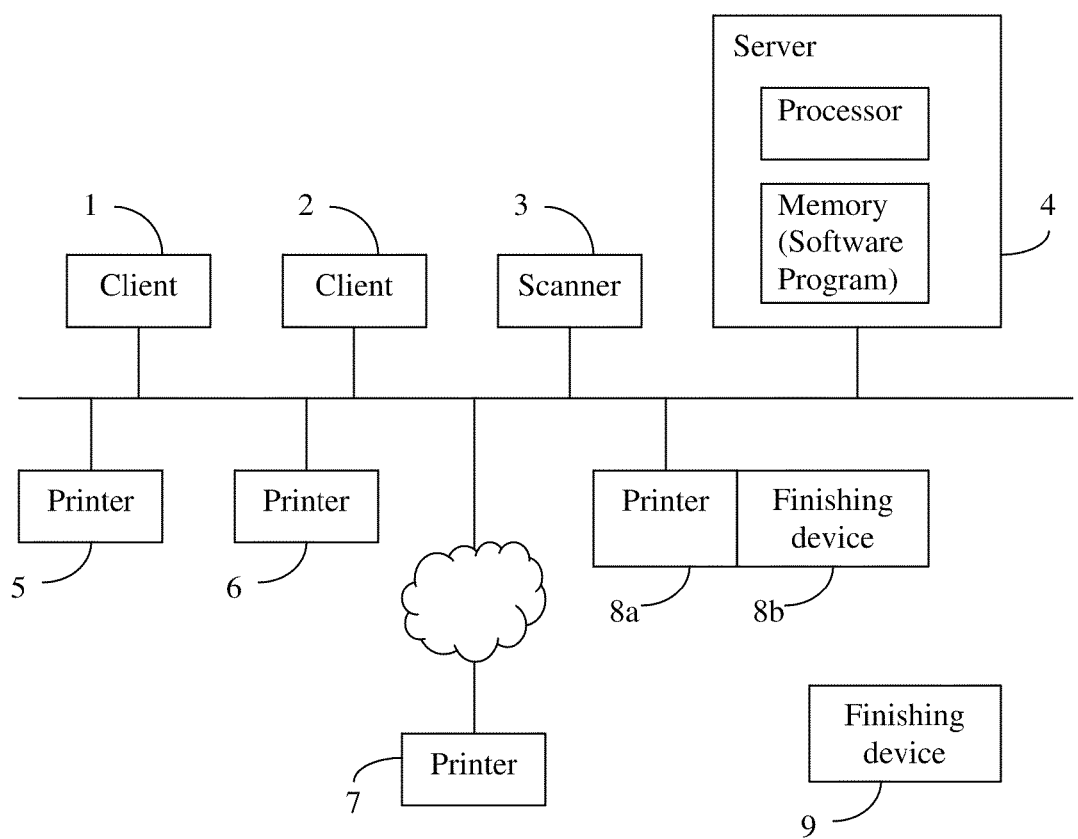
FIG. 1 schematically illustrates a print management system having multiple printers, finishing devices and a print job management server in which embodiments of the present invention can be implemented.

Commonly owned U.S. patent application Ser. No. 12/037, 529, filed Feb. 26, 2008, entitled "Multi-Tiered Constraint Checking for Managing Print Jobs" (hereinafter "the '529 application"), describes a method implemented in a print job management apparatus such as that shown in FIG. 1 for processing print jobs in a multiple-printer print shop environment. The print job management server 4 can receive print jobs from clients 2 and 3, and can automatically submit each of the print jobs to a printing device 5, 6, 7 or 8 for printing and (if required) finishing. It can also make recommendations (via an user interface or UI) to an operator as to which printing devices are suitable for handling a print job, so that the operator can assign the print job to a printing device based on the recommendation. Or, an operator can manually assign a print job to a printing device using the UI of the print job management software. (In this respect, it is noted that typically when an incoming print job is received by the print job management sever 4, no specific printer among the connected printers 5 through 8 has been assigned to the print job. Therefore, the incoming print jobs can be considered a printer independent print job.)

In the method described in the '529 application, when an operator manually assigns a print job to a printer, the server compares the print job requirements (i.e. job ticket settings) with capabilities of the printer to detect any constraints, i.e. incompatibilities between printer capabilities and print job requirements. If no constraint is detected, the job is printed on the assigned printer. If a constraint of a first category (mandatory constraint) is detected, such as incompatible color capabilities, paper size and type, layout, etc., printing will not proceed and an error message is displayed. If a constraint of a second category (optional constraint) is detected, such as inadequate finishing capabilities, a warning message is displayed with a request for operator instruction regarding whether to proceed with printing. If the operator chooses to proceed, the job will be printed, and a banner page containing instructions regarding uncompleted job requirements is generated, so that an operator can perform further operations to complete all job requirements.

In the method described in the '529 application, when a constraint is detected, the print shop management apparatus displays on a UI the job ticket parameters and/or printer settings that caused the constraint. For example, the UI may display a message about a constraint that states: "PunchSetting is ON; PK-51x is Not Installed"; or "OutputPaperSize is A6; PaperSource is Tray1". In these examples, the underlying causes for the constraints are that the job requires hole punch but a hole puncher is not installed, or that the paper tray 1 does not contain A6 size paper. However, although the offending job ticket settings are displayed, there is no textual explanation of the reason as to the offending condition. Simply viewing these job ticket setting values may be confusing to the operator and can hinder productivity if the operator must investigate the reason on his/her own. Further, the UI does not present an opportunity for the operator to modify these job ticket settings directly. Thus, the operator typically has to first write down or export the offending setting values, close the UI window and open the job ticket editor (a UI for editing job ticket settings) to make modifications to the job ticket. Once the changes are made, the operator has to save the changes and re-assign the job to the intended printer. This is inconvenient and inefficient, especially when the operator has to modify the job ticket multiple times until all constraints are resolved.

Embodiments of the present invention improves the method described in the '529 application by providing informative details about the constraints and by allowing the operator to modify the offending job ticket settings or printer settings and re-check the modified settings in real-time without using a full job ticket editing UI, thereby improving productivity and increasing efficiency. The embodiments may be implemented in a print job management server 4 of a print shop illustrated in FIG. 1.

Figure 2A:
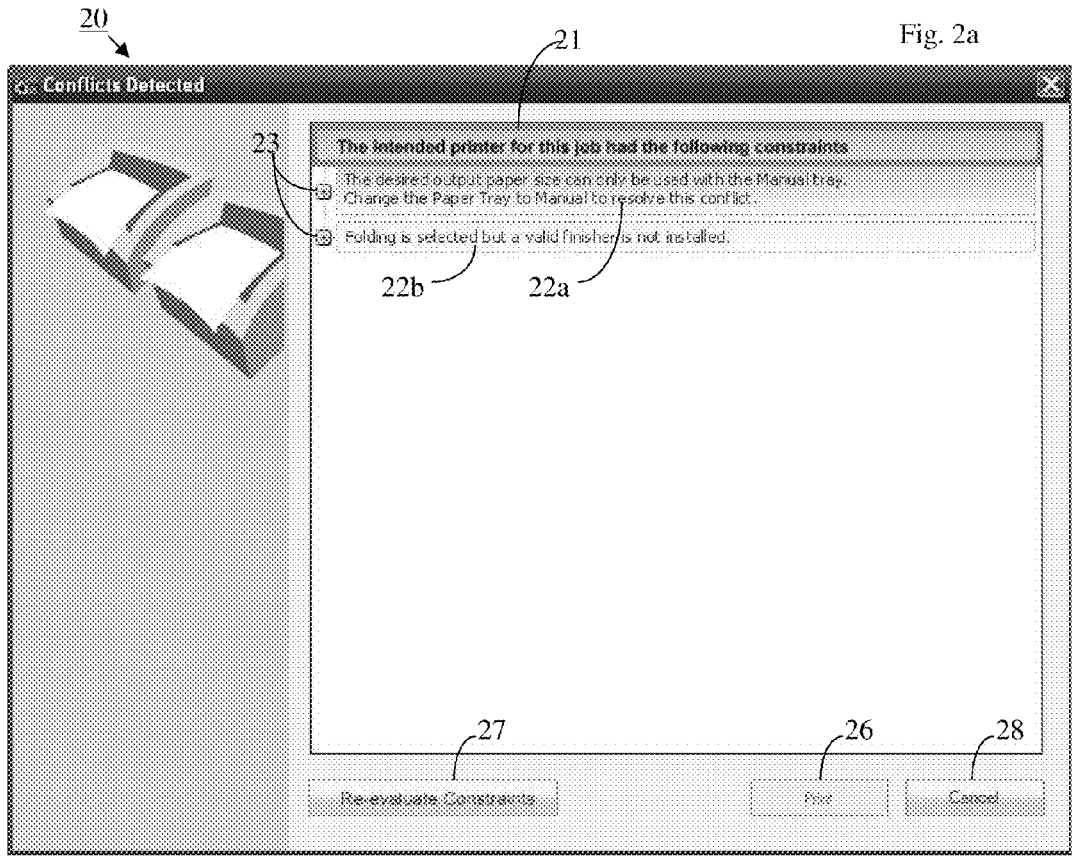
FIG. 2a illustrates an exemplary UI window for constraint display and re-evaluation according to an embodiment of the present invention.

FIG. 2a illustrates an exemplary UI window 20 that is displayed after the operator assigns a job to a printer and the print job management server 4 checks for constraints. The constraint display and re-evaluation window 20 includes a message area 21 containing one or more (two in this example)

constraint messages 22a and 22b about the constraints (which can be interchangeably referred to as conflicts). The messages describe the constraints as easily understood textual phrases. In this particular example, the message 22a states: "The desired output paper size can only be used with the Manual tray. Change the Paper Tray to Manual to resolve this conflict." The message 22b states: "Folding is selected but a valid finisher is not installed."

As described in the above-referenced '529 application, to detect constraints, the server compares the job ticket settings of the print job with the capabilities of the printer, which has been stored by the server in a file such as an XML-based constraints file. More specifically, an XML stream defines a set of constraints. The XML stream is parsed to define a set of constraints to be stored in the job ticket session. Each constraint has an error code and a set of features and their values. Each feature ID matches the name of a field within a sub-job ticket. The constraints XML can be validated against an XML schema. An example of the XML defining a set of constraints was given in the '529 application:

```
<?xml version="1.0" encoding="utf-8"?>
<ConstraintList
    xmlns:xsi="http://www.w3.org/2001/XMLSchema-instance"
    xsi:noNamespaceSchemaLocation="Constraints.xsd">
  <Constraint ErrorCode="2">
    <Feature ID="OutputPaperSize" Value="A6"/>
    <Feature ID="PaperSource" Value="Tray1"/>
  </Constraint>
  <Constraint ErrorCode="3">
    <Feature ID="OutputPaperSize" Value="A6"/>
    <Feature ID="PaperSource" Value="Tray2"/>
  </Constraint>
</ConstraintList>
```

To implement the textual messages such as the messages 22a and 22b in FIG. 2a, according to an embodiment of the present invention, another tag is added to each <Constraint> block such as <Description> which accepts a Value parameter. The above example may be modified as follows:

```
<?xml version="1.0" encoding="utf-8"?>
<ConstraintList
    xmlns:xsi="http://www.w3.org/2001/XMLSchema-instance"
    xsi:noNamespaceSchemaLocation="Constraints.xsd">
  <Constraint ErrorCode="2">
    <Description Value="The desired output paper size can only be
       used with the Manual tray.\nChange the Paper Tray to Manual to
       resolve this conflict."/>
    <Feature ID="OutputPaperSize" Value="A6"/>
    <Feature ID="PaperSource" Value="Tray1"/>
  </Constraint>
  <Constraint ErrorCode="3">
    <Description Value="The desired output paper size can only be
       used with the Manual tray.\nChange the Paper Tray to Manual to
       resolve this conflict."/>
    <Feature ID="OutputPaperSize" Value="A6"/>
    <Feature ID="PaperSource" Value="Tray2"/>
  </Constraint>
</ConstraintList>
```

Alternatively, the textual messages can also be implemented using a string table, whereby each <Constraint> tag's numeric ErrorCode value is mapped to a pre-defined textual string value. This method may allow for easier support of other foreign languages if the product requires multilingual capabilities. Other suitable methods may be employed to implement the textual messages.

Referring back to FIG. 2a, in the message area 21, visual indications such as colors of the text or color highlights may be used to indicate whether each constraint is mandatory or optional. When a mandatory constraint exists, printing is prohibited and a Print button 26 of the UI window 20 is grayed out and disabled. When only optional constraints exist or no constraint exists, the Print button 26 is enabled and the operator can proceed with printing the job. In the example shown in FIG. 2a, the first constraint 22a is mandatory and the second constraint 22b is optional, and the Print button 26 is disabled.

Figure 2B:
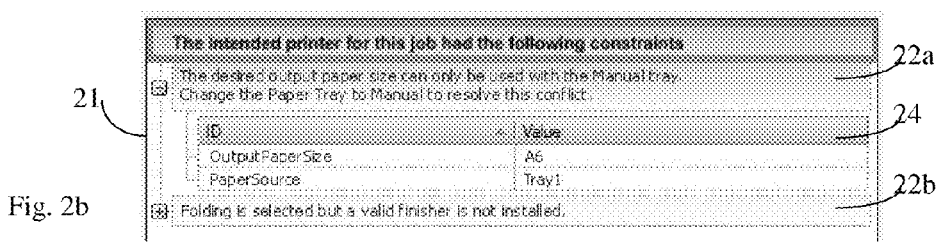
FIG. 2b illustrates the message area of the UI window of FIG. 2a when one of the constraint messages is in the expanded state.

The constraint messages 22a and 22b are displayed as collapsible/expandable objects. The messages 22a, etc. are initially displayed in the collapsed state as shown in FIG. 2a, which significantly reduces the number of lines of text initially displayed to the operator, minimizing clutter on the UI. If the operator clicks on an expand/collapse tool 23 next to a message 22a or 22b (or click on the message itself), the message is expanded to display the job ticket settings that caused the constraint. FIG. 2b illustrates the message area 21 of FIG. 2a after the first message 22a is expanded to show the job ticket settings 24. Each job ticket setting is listed by its ID and value. In this example, the expanded message lists two job ticket settings that caused the constraint: "OutputPaperSize A6" and "PaperSource Tray1". The job ticket settings 24 are displayed adjacent the corresponding message 22a.

Alternatively, although less preferred, the constraint messages 22a and 22b may be displayed as normal, non-collapsible/expandable objects, and all job ticket settings that caused the corresponding constraints are displayed in the message area 21 simultaneously. Each job ticket setting 24 is displayed adjacent to the constraint that it is associated with.

Figure 2C:
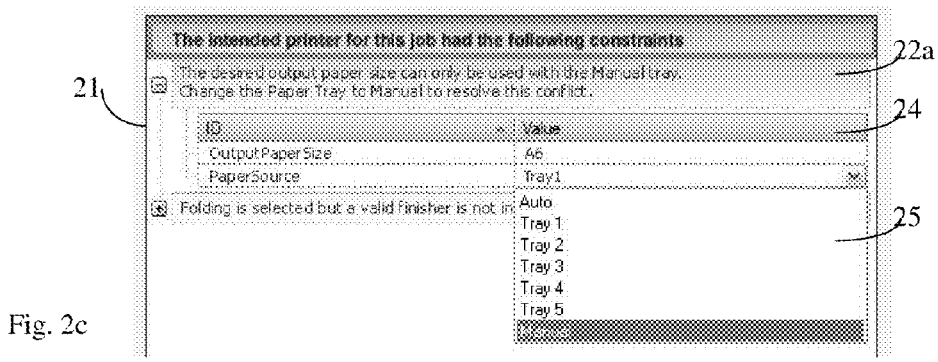
FIG. 2c illustrates the message area of the UI window of FIG. 2a when a drop-down selection of job ticket setting values is displayed.

The job ticket settings 24 can be expanded to show possible alternative values of each setting. For example, as shown in FIG. 2c, when the operator clicks on the "Tray1" value (which is the current value for the PaperSouce setting), a drop-down list 25 is displayed to show all possible values for this setting. In this example, the possible values are "Auto", "Tray1", . . . "Tray5", and "Manual". The operator, with the benefit of the text of message 22a still displayed, can select "Manual" as suggested by the message 22a.

Figure 2D:
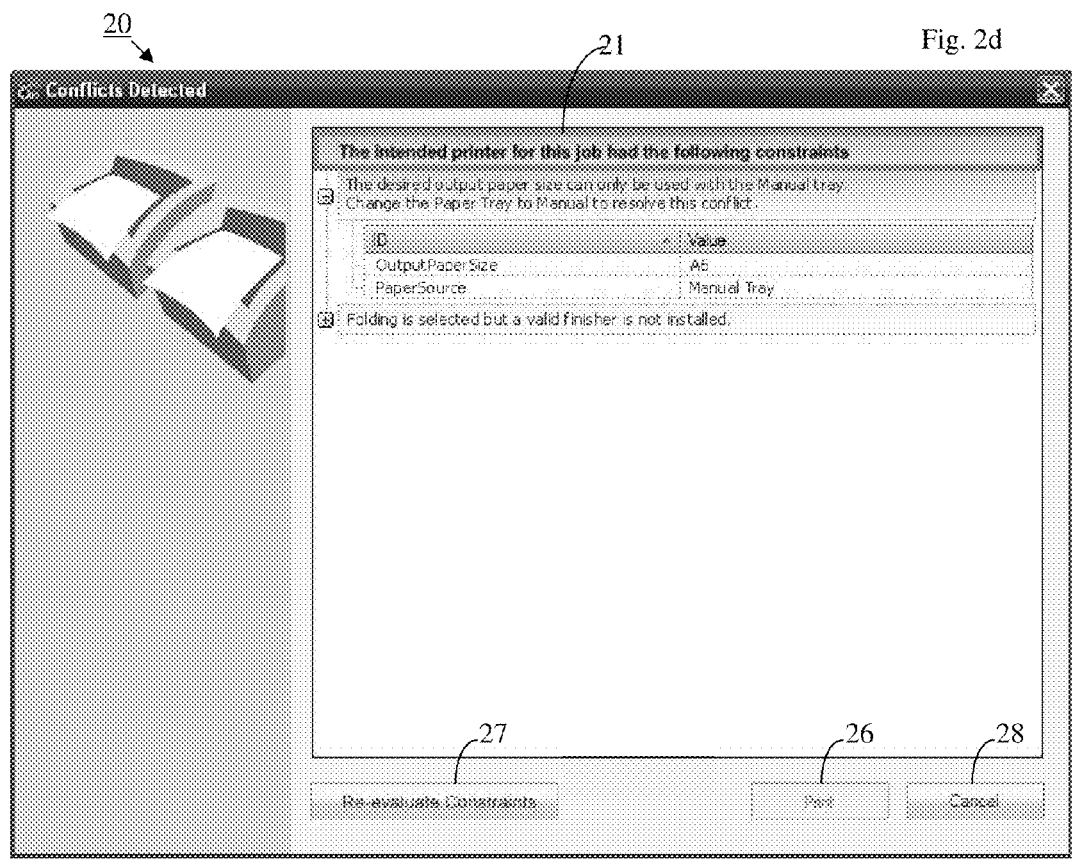
FIG. 2d illustrates the UI window of FIG. 2a after the operator modifies a job ticket setting value.
Figure 2E:
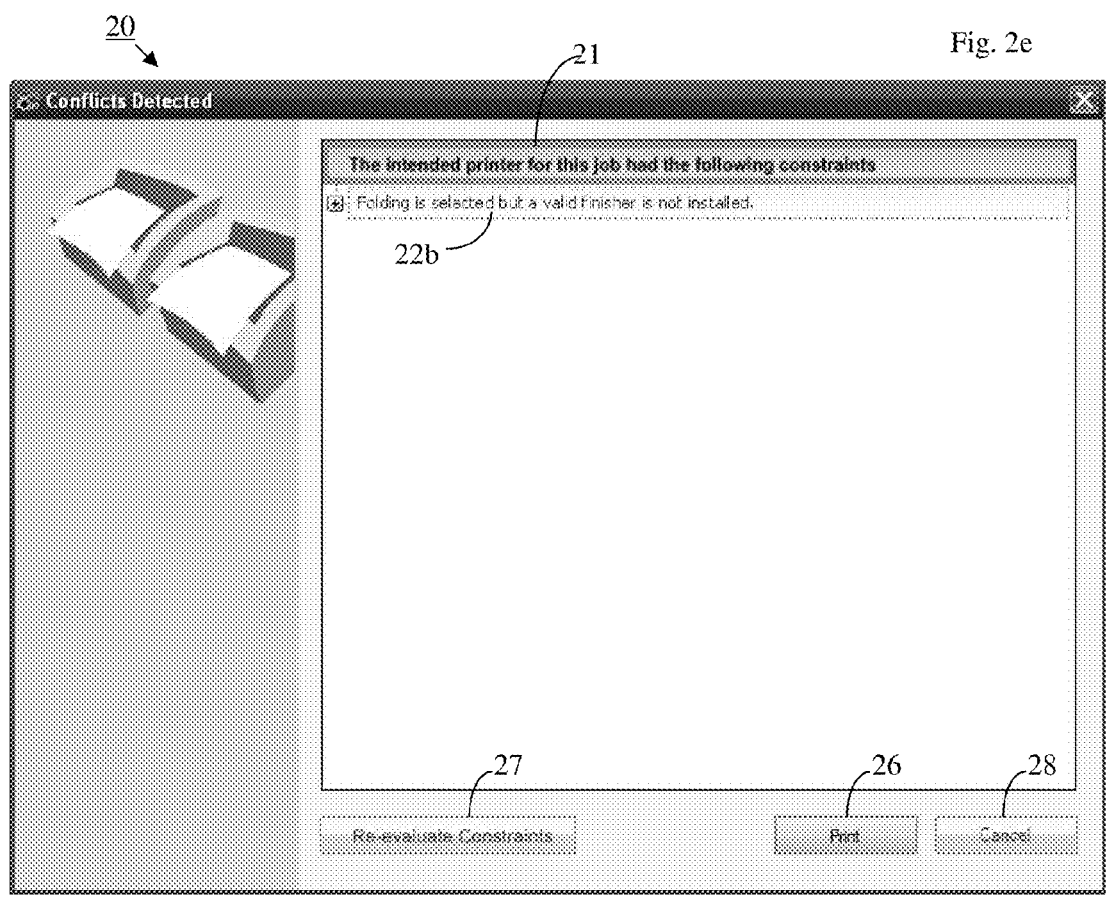
FIG. 2e illustrates the UI window of FIG. 2a after the constraints are re-evaluated and the message display is updated.

Once the operator has changed the setting as desired, he can click on the "Re-evaluate Constraints" button 27 provided in the UI window 20, as shown in FIG. 2d. At this point, the print job management server 4 executes the constraint checking algorithm again. After the re-evaluation, the message area 21 will be updated accordingly. In this example, since the PaperSource setting has been changed to Manual Tray, the first constraint message 22a will disappear from the message area 21, as shown in FIG. 2e. Further, since only an optional constraint 22b still exists, the Print button 26 is enabled and the operator may choose to proceed with printing. The operator may alternatively choose to resolve the remaining optional constraint (in a manner similar to FIGS. 2b-2d) and then print the job. If all constraints are resolved, the message area 21 will display a message informing the operator that there are no constraints for this job for the invented printer and that the job can now be printed by clicking the "Print" button.

Alternatively, in the UI window 20, rather than providing the "Re-evaluate Constraints" button 27, the constraint check may be calculated on-the-fly as the operator changes any one of the offending job ticket settings value to determine if the constraint has been rectified. This approach has the disadvantage that the operator may have accidentally selected an undesired value from the drop-down list 25.

When the operator selects the "Re-evaluate Constraints" button to re-evaluate the constraints, the print shop management server 4 makes a temporary version of the job ticket with the changed setting values to re-evaluate whether the temporary copy of job ticket causes any constraints. Once the operator has committed to printing the job with the changed job ticket settings by clicking on the "Print" button 26, the server updates the original job ticket by replacing appropriate setting values with the values retained in the temporary version, or by replacing the entire original job ticket with the temporary version, so that the new settings are saved. If, on the other hand, the operator chooses to cancel out of the constraint display and re-evaluation window 20 without printing, by clicking on the "Cancel" button 28 provided in the window 20, the temporary job ticket settings retained by the server are purged and the original job ticket settings values are left intact on the server.

As seen from the above descriptions, a single UI window 20 is used to perform the steps of displaying constraint messages, displaying job ticket settings that caused the constraint, selecting new values for the job ticket settings, re-evaluating constraints using the new values, updating the display of constraint messages based on the re-evaluation, and printing the job. The operator does not need to leave this UI window, nor does he need to open another UI window to modify the job ticket and re-assign the job to the printer.

The UI window 20 and its various display elements shown in FIGS. 2a-2e can be implemented by any suitable programming techniques. It should be noted that although examples of the UI displays in FIGS. 2a-2e are shown and described in detail here, the invention is not limited to the specifics of the user interface displays. The invention may be implemented using any forms of UI displays, as long as the UI includes appropriate display and input means that display the desired information and allow the user to take desired actions. The display and input means may be buttons, check boxes, radio buttons, text input fields, drop-down menus, pop-up menus, icons, tabs for bringing up different sheets, separate windows, etc., or combinations thereof, or any other suitable structure. The computer software designs for suitable structures of the input means are apparent and familiar to a person of ordinary skill in this field. Therefore, detailed descriptions for these structures are omitted from here. The term "user interface display" is used to generally mean any suitable screen display that displays information to the user and/or allows the user to input commands and other information, and is not limited to any specific form of display, and may include a series of consecutive displays.

Figure 3:
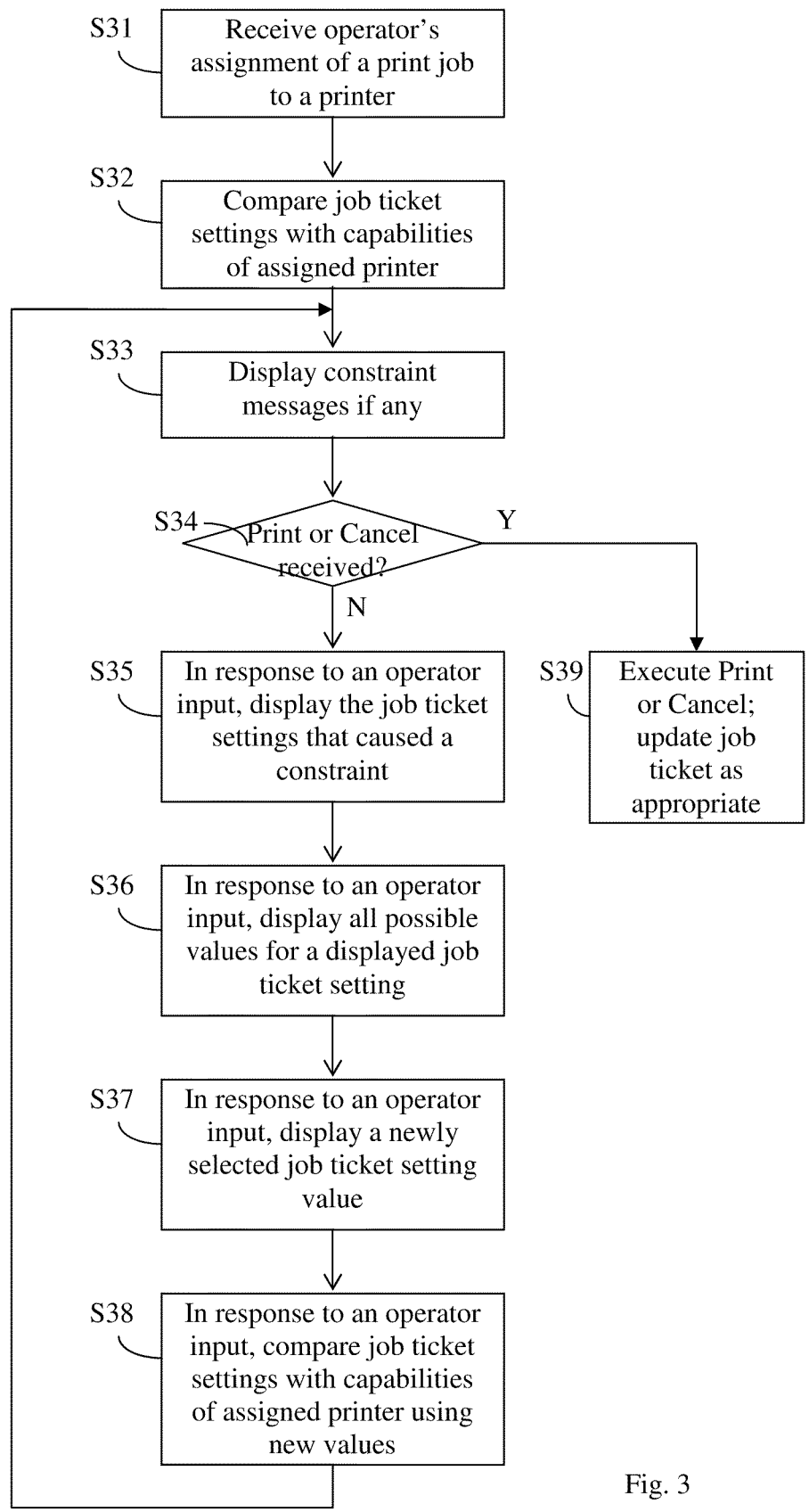
FIG. 3 is a flow chart illustrating a constraint display and re-evaluation process according to an embodiment of the present invention.

FIG. 3 illustrates a process flow of the print job constraint display and re-evaluation process. First, the print job management server 4 receives an assignment of a print job to a printer by an operator (step S31). The server compares the job ticket settings with the capabilities and settings of the assigned printer (step S32). The server displays constraint messages in a UI for any constraints detected (step S33), for example, as shown in FIG. 2a. The messages are textual messages describing the constrains and are displayed as expandable/collapsible objects.

Then, in response to an operator input to expand a constraint message, such as a click on an expand/collapse tool 23 as shown in FIG. 2a, the server displays the job ticket settings that caused that constraint (step S35), for example, as shown in FIG. 2b. In response to an operator input to display alternative values of a displayed job ticket setting, such as a click on the current value being displayed, the server displays a list of all possible values for that job ticket setting (step S36), for example, as shown in FIG. 2c. In response to an operator input to select one of the displayed setting values, the server displays the newly selected job ticket setting value (step S37), for example as shown in FIG. 2d. Steps S35 to S37 may be repeated to select new values for other job ticket settings or other constraints.

Then, in response to an operator input to re-evaluate constraints, such as a click on the Re-evaluate button 27, the server compares the job ticket settings (with the new values) with the capabilities and settings of the assigned printer (step S38). Preferably, the server makes a temporary version of the job ticket to perform the re-evaluation. Steps S33 to S38 may be repeated as desired to resolve any remaining constraints.

If a print or cancel input is received from the operator ("Y" in step S34), such as a click on the Print button 26 or Cancel button 28, the server executes printing of the job or terminates the process as appropriate (step S39). Step S39 also saves the new job setting values as appropriate. Steps S34 and S39 may also occur anywhere between steps S35 to S38.

The print job constraint display and re-evaluation process described above has many advantages. It provides an improved user interface by displaying a textual explanation of the constraint and/or tips to rectify or remediate the constraint. It uses a collapse-able display mechanism, and allows the offending job ticket settings to be displayed and modified on-the-fly. Because the offending job ticket settings are displayed adjacent the constraint message, it is easy to see which job ticket settings are involved and need to be changed. The method increases productivity and efficiency by allowing for the operator to modify offending job ticket settings within the constraint display window, and by automatically saving the changes made to the offending job ticket settings when the operator chooses to print the job. In the mean time, retaining the original job ticket up until the printing time allows the operator to cancel the changes without losing the original job ticket settings. Further, new job ticket setting values are re-evaluated for constraints without having to repeat the job ticket editing and job assignment process, increasing operating efficiency.

It will be apparent to those skilled in the art that various modification and variations can be made in the print job constraint display and re-evaluation process and related apparatus of the present invention without departing from the spirit or scope of the invention. Thus, it is intended that the present invention cover modifications and variations that come within the scope of the appended claims and their equivalents.

What is claimed is:

1. A method implemented in a print shop management apparatus for managing a plurality of print jobs, each print job including a job ticket having a plurality of settings, the print shop management apparatus being connected to a plurality of printers each having its capabilities, the method comprising:
   (a) receiving an assignment of a print job to a printer by an operator, the print job including a job ticket having a plurality of original job ticket settings;
   (b) evaluating the assignment to detect any constraints by comparing the job ticket settings with capabilities of the printer;
   (c) displaying one or more messages each regarding a detected constraint;
   (d) displaying one or more job ticket settings that caused a detected constraint, the job ticket settings being displayed adjacent the corresponding message;
   (e) receiving a first operator input for changing a job ticket setting value of a job ticket setting displayed in step (d); and
   (f) in response to a second operator input, re-evaluating the assignment to detect any constraints by comparing the job ticket settings including the changed value received in step (e) with the capabilities of the printer.

2. The method of claim 1, wherein in step (c), each message includes a textual description of the detected constraint or tips to rectify the constraint.

3. The method of claim 2, wherein the job ticket settings in step (d) are displayed in response to a third operator input.

4. The method of claim 1, wherein step (e) comprises:
 (e1) in response to a fourth operator input, displaying all possible values for a job ticket setting displayed in step (d); and
 (e2) receiving the first operator input, the first operator input being a value selected from the possible values displayed in step (e1).

5. The method of claim 1, wherein step (f) comprises:
 (f1) generating a temporary version of the job ticket including the changed values received in step (e) while retaining the original job ticket settings; and
 (f2) comparing the job ticket settings of the temporary version with the capabilities of the printer.

6. The method of claim 5, further comprising:
 (g) in response to a fifth operator input, printing the print job and updating the job ticket according to the changed values in the temporary version.

7. The method of claim 1, wherein the display in step (c), the display in step (d), the first operator input in step (e), and the second operator input in step (f) are performed using a single user interface display.

8. A computer program product comprising a computer usable non-transitory medium having a computer readable program code embedded therein for controlling a data processing apparatus, the computer readable program code configured to cause the data processing apparatus to execute a process for managing a plurality of print jobs, each print job including a job ticket having a plurality of settings, the process comprising:
 (a) receiving an assignment of a print job to a printer by an operator, the print job including a job ticket having a plurality of original job ticket settings;
 (b) evaluating the assignment to detect any constraints by comparing the job ticket settings with capabilities of the printer;
 (c) displaying one or more messages each regarding a detected constraint;
 (d) displaying one or more job ticket settings that caused a detected constraint, the job ticket settings being displayed adjacent the corresponding message;
 (e) receiving a first operator input for changing a job ticket setting value of a job ticket setting displayed in step (d); and
 (f) in response to a second operator input, re-evaluating the assignment to detect any constraints by comparing the job ticket settings including the changed value received in step (e) with the capabilities of the printer.

9. The computer program product of claim 8, wherein in step (c), each message includes a textual description of the detected constraint or tips to rectify the constraint.

10. The computer program product of claim 9, wherein the job ticket settings in step (d) are displayed in response to a third operator input.

11. The computer program product of claim 8, wherein step (e) comprises:
 (e1) in response to a fourth operator input, displaying all possible values for a job ticket setting displayed in step (d); and
 (e2) receiving the first operator input, the first operator input being a value selected from the possible values displayed in step (e1).

12. The computer program product of claim 8, wherein step (f) comprises:
 (f1) generating a temporary version of the job ticket including the changed values received in step (e) while retaining the original job ticket settings; and
 (f2) comparing the job ticket settings of the temporary version with the capabilities of the printer.

13. The computer program product of claim 12, wherein the process further comprises:
 (g) in response to a fifth operator input, printing the print job and updating the job ticket according to the changed values in the temporary version.

14. The computer program product of claim 8, wherein the display in step (c), the display in step (d), the first operator input in step (e), and the second operator input in step (f) are performed using a single user interface display.

15. A computer implemented method executed in a print shop management apparatus for managing a plurality of print jobs, each print job including a job ticket having a plurality of settings, the print shop management apparatus being connected to a plurality of printers each having its capabilities and executing print shop management software to carry out the method, the method comprising:
 (a) receiving a printer independent print job, the printer independent print job including a job ticket having a plurality of original job ticket settings;
 (b) detecting any constraints by comparing the job ticket settings with capabilities of a printer;
 (c) displaying one or more messages each regarding a detected constraint and one or more job ticket settings that caused a detected constraint in association with the corresponding message;
 (d) receiving a first operator input for changing a job ticket setting value of a job ticket setting displayed in step (c); and
 (e) detecting any constraints by comparing the job ticket settings including the changed value received in step (d) with the capabilities of the printer.

16. The method of claim 15, wherein in step (c), each message includes a textual description of the detected constraint or tips to rectify the constraint.

17. The method of claim 16, wherein the job ticket settings in step (c) are displayed in response to a second operator input.

18. The method of claim 15, wherein step (d) comprises:
 (d1) in response to a third operator input, displaying all possible values for a job ticket setting displayed in step (c); and
 (d2) receiving the first operator input, the first operator input being a value selected from the possible values displayed in step (d1).

19. The method of claim 15, wherein step (e) comprises:
 (e1) generating a temporary version of the job ticket including the changed values received in step (e) while retaining the original job ticket settings; and
 (e2) comparing the job ticket settings of the temporary version with the capabilities of the printer.

20. The method of claim 19, further comprising:
 (f) in response to a fourth operator input, printing the print job and updating the job ticket according to the changed values in the temporary version.

21. The method of claim 15, wherein the display in step (c) and the first operator input in step (d) are performed using a single user interface display.

* * * * *